United States Patent
Johnson

(10) Patent No.: US 7,690,974 B2
(45) Date of Patent: Apr. 6, 2010

(54) DEBRIS DEFLECTOR BETWEEN CAB AND HEADER

(76) Inventor: Lowell D. Johnson, 3215 CR 1700E, Rantoul, IL (US) 61866

( * ) Notice: Subject to any disclaimer, the term of this patent is extended or adjusted under 35 U.S.C. 154(b) by 0 days.

(21) Appl. No.: 11/899,820

(22) Filed: Sep. 7, 2007

(65) Prior Publication Data
US 2008/0060332 A1 Mar. 13, 2008

Related U.S. Application Data

(60) Provisional application No. 60/843,082, filed on Sep. 8, 2006.

(51) Int. Cl.
*A01F 12/54* (2006.01)
(52) U.S. Cl. ........................ 460/117; 280/507
(58) Field of Classification Search ............... 56/10.1, 56/13.3, 13.4, 13.5, 13.6; 460/16, 17, 18, 460/19, 20, 117, 901, 97, 99, 100, 101, 102; 296/190.01; 180/89.12, 84; 280/847, 848, 280/507
See application file for complete search history.

(56) References Cited

U.S. PATENT DOCUMENTS

| | | | | |
|---|---|---|---|---|
| 2,279,934 A | | 4/1942 | Wisecup | |
| 2,370,990 A | * | 3/1945 | Nissen | 482/28 |
| 3,004,623 A | * | 10/1961 | Nissen | 482/28 |
| 3,011,826 A | * | 12/1961 | Elkins et al. | 297/383 |
| 3,109,273 A | * | 11/1963 | Soldner | 56/190 |
| 3,123,383 A | | 3/1964 | Humpal | |
| 3,278,222 A | * | 10/1966 | Mullet et. al. | 296/190.08 |
| 3,664,699 A | * | 5/1972 | Weigelt | 292/251.5 |
| 3,813,712 A | * | 6/1974 | Bonnin | 5/625 |
| 3,961,465 A | | 6/1976 | Winings | |
| 3,998,489 A | * | 12/1976 | Blakeslee | 296/190.1 |
| 4,345,793 A | * | 8/1982 | Duda | 297/423.4 |
| 4,474,369 A | * | 10/1984 | Gordon | 472/92 |
| 4,504,987 A | * | 3/1985 | Spitz | 5/13 |
| 4,688,846 A | * | 8/1987 | Martin, Jr. | 296/102 |
| 4,905,770 A | | 3/1990 | Hanig | |
| 4,927,440 A | | 5/1990 | Butler et al. | |
| 4,959,916 A | | 10/1990 | Cochrane | |
| 5,061,011 A | * | 10/1991 | Miller | 297/423.4 |
| 5,251,427 A | | 10/1993 | Ulschmid et al. | |
| 5,322,472 A | * | 6/1994 | Little | 460/117 |
| 5,553,981 A | | 9/1996 | Braden | |
| 5,829,775 A | * | 11/1998 | Maxwell et al. | 280/507 |
| 5,833,234 A | * | 11/1998 | Vavala et al. | 473/434 |
| 6,022,038 A | * | 2/2000 | Maxwell et al. | 280/507 |

(Continued)

*Primary Examiner*—Árpád Fábián-Kovács
(74) *Attorney, Agent, or Firm*—Knechtel, Demeur & Samlan

(57) ABSTRACT

A debris deflector having a proximal end, a distal end, and opposed sides. The debris deflector uses a flexible connecting device for attaching the proximal end to a combine and a rigid connecting device for attaching the distal end to a header of the combine. The flexible connecting device comprises a spring device at each opposed side of the debris deflector adjacent the proximal end having hooks or other device for fastening or connecting to the combine and a rigid member releasably retained by a sleeve at the proximal end of the debris deflector. The rigid connecting device comprises a magnet at each opposed side of the debris deflector adjacent the distal end for magnetically connecting to the header of the combine and a nut and bolt fastener or other device for fastening or connecting the magnet to another rigid member releasably retained by a sleeve at the distal end of the debris deflector.

13 Claims, 3 Drawing Sheets

U.S. PATENT DOCUMENTS

| | | |
|---|---|---|
| 6,076,340 A | 6/2000 | Fowler |
| 6,109,655 A * | 8/2000 | Wheeler ..................... 280/847 |
| 6,220,648 B1 | 4/2001 | Daniel |
| 6,272,821 B1 | 8/2001 | Wigdahl |
| 6,363,700 B1 | 4/2002 | Fowler |
| 6,659,859 B2 * | 12/2003 | Nieschulze ................. 460/117 |
| 6,938,401 B2 | 9/2005 | Bares et al. |
| 2002/0073670 A1 | 6/2002 | Nieschulze |
| 2004/0074611 A1 * | 4/2004 | Colson et al. ............ 160/84.05 |
| 2004/0189947 A1 * | 9/2004 | Hattori et al. ................. 353/13 |
| 2005/0086921 A1 | 4/2005 | Bares et al. |
| 2005/0086922 A1 | 4/2005 | Bares et al. |
| 2006/0055225 A1 * | 3/2006 | Yasuda et al. .......... 297/452.18 |

\* cited by examiner

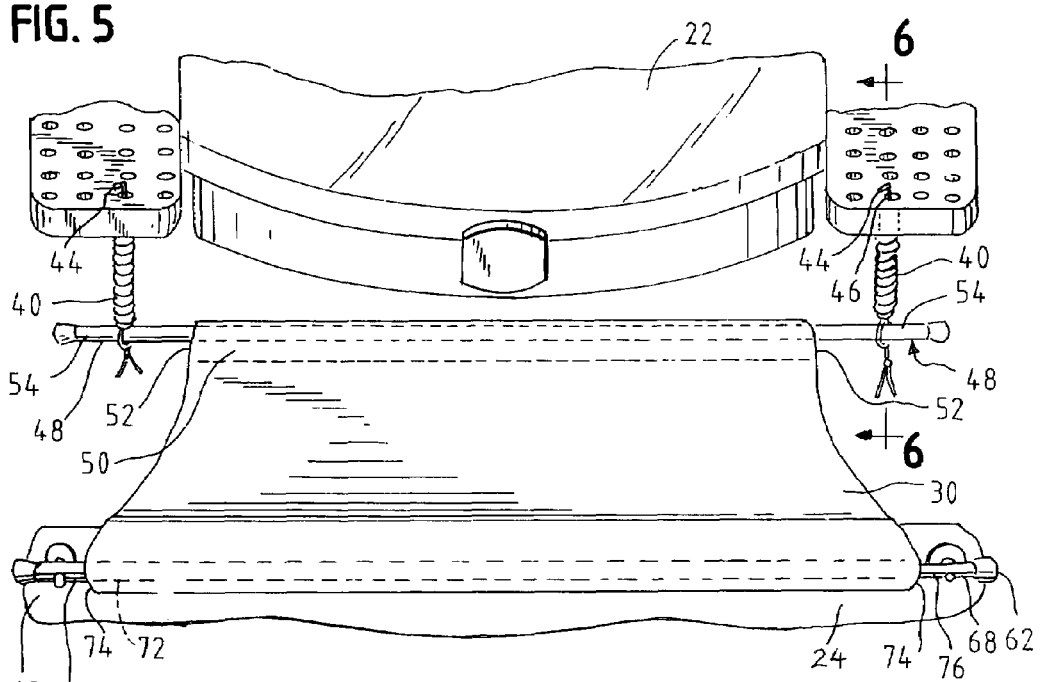
FIG. 5
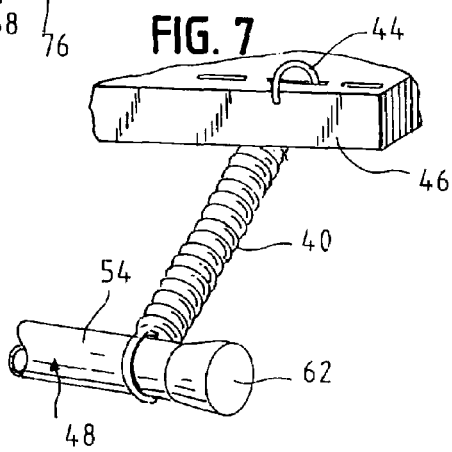
FIG. 7
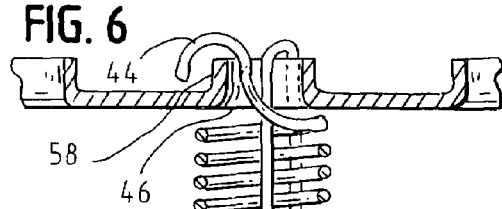
FIG. 6
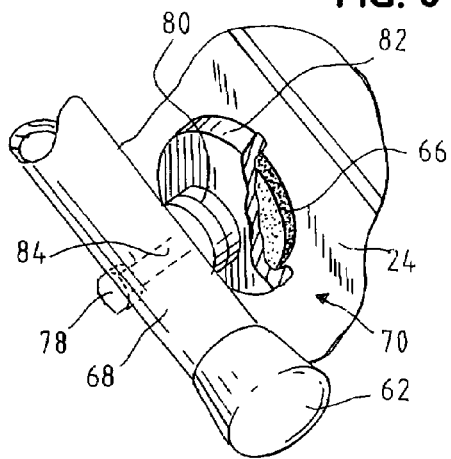
FIG. 8
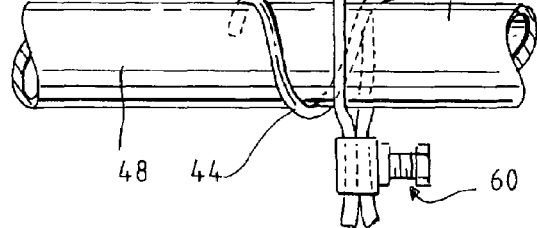

DEBRIS DEFLECTOR BETWEEN CAB AND HEADER

I. CROSS-REFERENCE TO RELATED APPLICATION

This patent application is a non-provisional application claiming priority from U.S. Provisional Patent Application Ser. No. 60/843,082, entitled "Debris Deflector," filed on Sep. 8, 2006, and is fully incorporated herein by reference.

II. FIELD OF THE INVENTION

The present invention relates to deflectors and, more particularly, to a deflector for preventing the undesired accumulation of debris or other material on combine feeder houses when harvesting crops.

III. DESCRIPTION OF THE PRIOR ART

Combine equipment has been around for a long time and is used for harvesting all types or forms of crops such as soybeans, wheat, barley, rice, corn, etc. In harvesting a crop, the combine performs various actions with respect to the crop. In one action, as illustrated in FIG. 1, for example, the crop 20 being harvested by a combine 22 is feed through a header 24 and transferred onto a conveyor system within a feeder house 26 that is attached adjacent to and behind the header 24. The crop continues traversing through the feeder house 26 and into the combine 22 for subsequent threshing.

During this process, however, some of the crop that is being harvested and other foreign material such as leaves that happens to be in the crop escapes over the header and the feeder house. When this occurs, the crop and other foreign material ("material 28") begins to accumulate on top of the feeder house. This accumulation of material 28 is also more clearly illustrated in FIG. 2.

This accumulation of material 28 causes many problems. First, one must continually stop the operation of the combine to remove the material. This is very inconvenient and time consuming. Second, if it rains before the operator can remove this material, the material then becomes saturated causing the material to coagulate into a heavy heap that is more difficult to remove than if dry. Third, if the material is permitted to accumulate, it could easily build-up and become wedged between the cab of the combine and the feeder house. As electrical systems are located in that area of the combine, this could cause the material to combust. Lastly, the material could build-up sufficient to inhibit the visibility of the driver sitting in the cab of the combine.

Thus, there is a need and there has never been disclosed Applicant's unique debris deflector.

IV. SUMMARY OF THE INVENTION

The present invention is a debris deflector having a proximal end, a distal end, and opposed sides. The debris deflector uses a flexible connecting means for attaching the proximal end to a combine and a rigid connecting means for attaching the distal end to a header of the combine. The flexible connecting means comprises a spring means at each opposed side of the debris deflector adjacent the proximal end having hooks or other means for fastening or connecting to the combine and a rigid member releasably retained by a sleeve at the proximal end of the debris deflector. The rigid connecting means comprises a magnet at each opposed side of the debris deflector adjacent the distal end for magnetically connecting to the header of the combine and a nut and bolt fastener or other means for fastening or connecting the magnet to another rigid member releasably retained by a sleeve at the distal end of the debris deflector.

V. BRIEF DESCRIPTION OF THE DRAWINGS

The Description of the Preferred Embodiment will be better understood with reference to the following figures:

FIG. 5 is a front perspective view of the debris deflector as attached to a combine.

FIG. 6 is a cross-sectional view, taken along line 6-6 of FIG. 5, illustrating the flexible connecting means for attaching the proximal end of the debris deflector to the combine.

FIG. 7 is a perspective view of the flexible connecting means for attaching the proximal end of the debris deflector to the combine.

FIG. 8 is a perspective view of the rigid connecting means for attaching the distal end of the debris deflector to the combine.

VI. DETAILED DESCRIPTION OF THE PREFERRED EMBODIMENT

Figure 1:
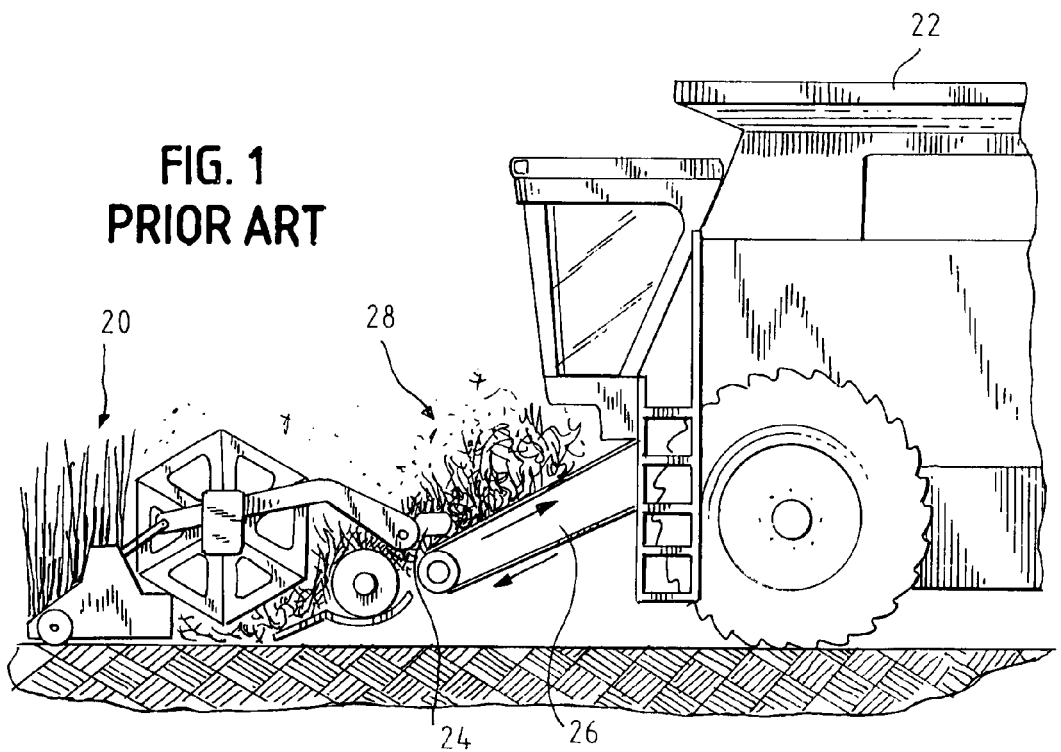
FIG. 1 is a side view of a combine, with portions removed, depicting material accumulating on the feeder house during the harvesting of a crop.
Figure 2:
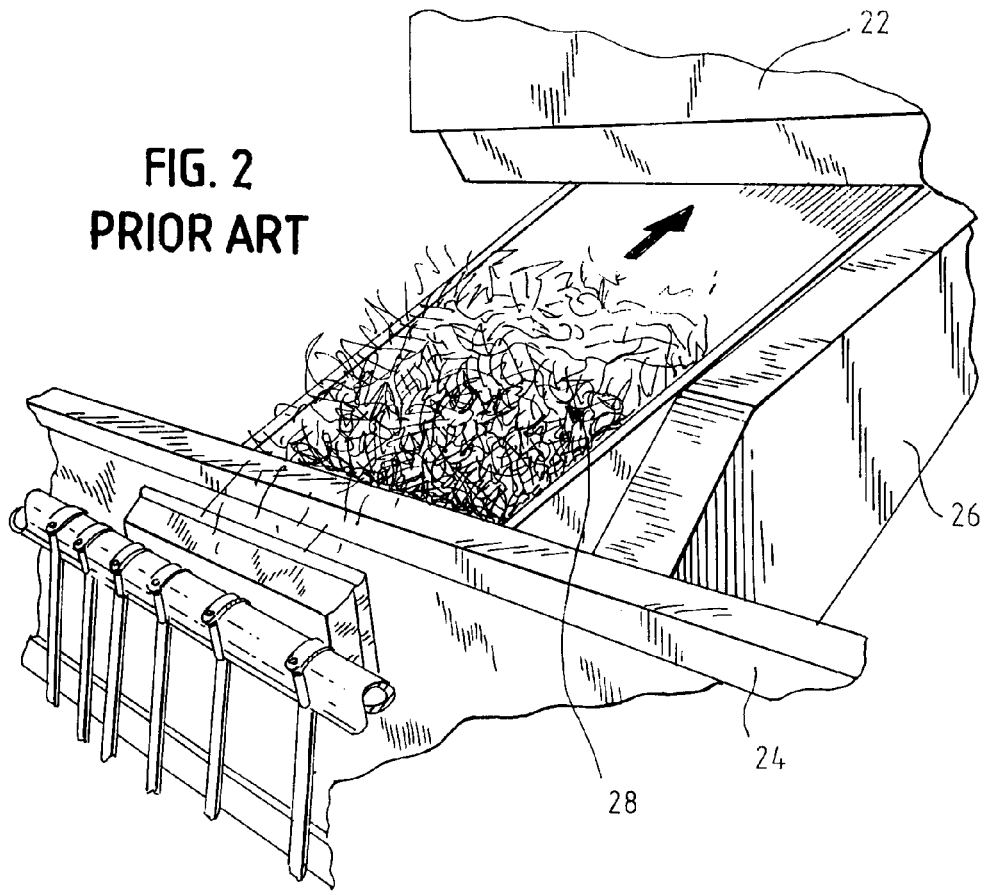
FIG. 2 is a perspective view of a combine, with portions removed, depicting material accumulating on the feeder house during the harvesting of a crop.
Figure 3:
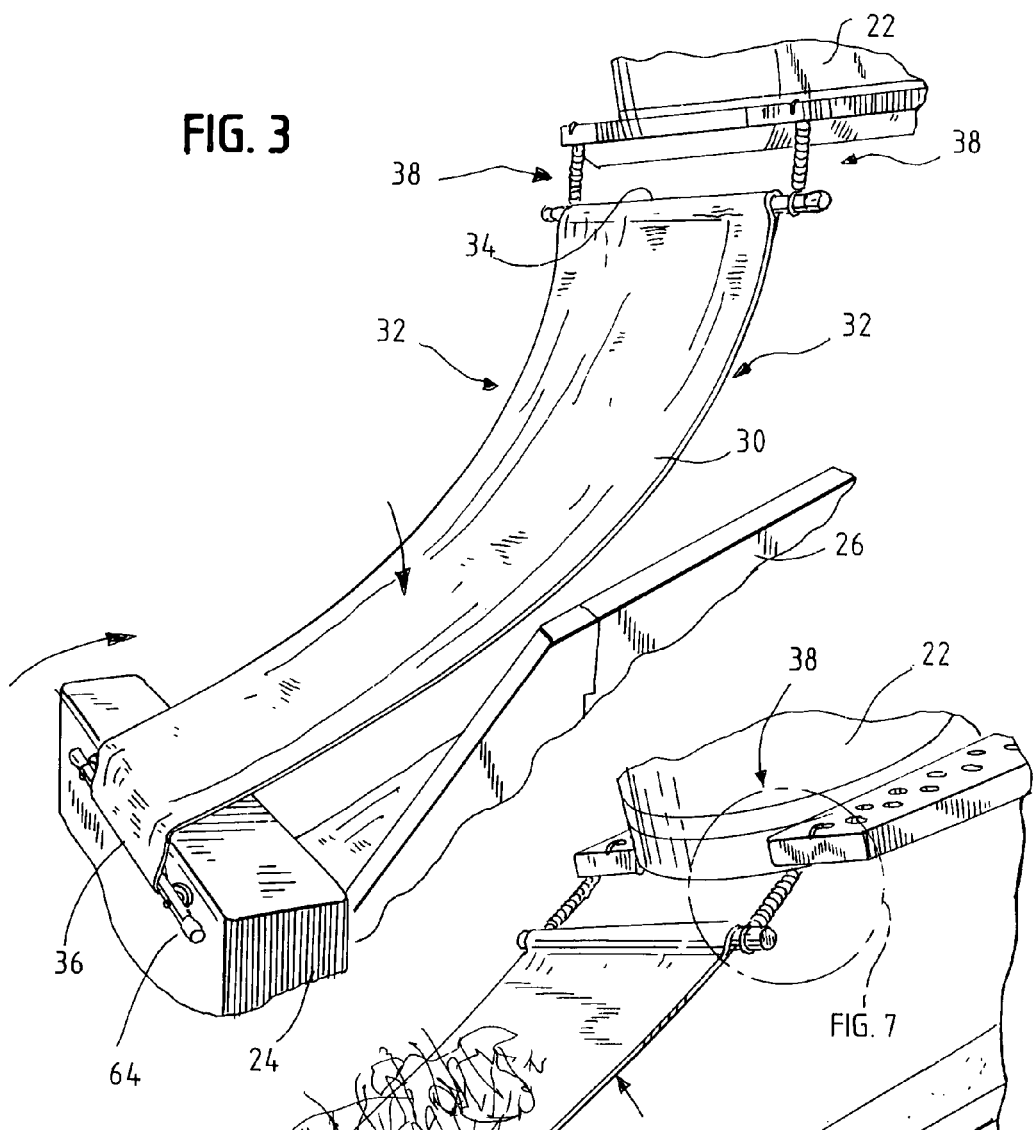
FIG. 3 is a perspective view of the debris deflector as attached to a combine when not in use.

Turning to FIG. 3, there is illustrated Applicant's debris deflector 30. In the preferred embodiment, the debris deflector 30 is an elongated member or cover having opposed sides 32, a proximal end 34, and a distal end 36. The debris deflector 30 is preferably made of a poly-canvas material that is sufficiently heavy to accomplish the intended purposes as described herein. Alternatively, it is contemplated that any other material may be used for the debris deflector 30 provided that it is sufficiently heavy to accomplish the intended purposes as described herein.

A flexible connecting means 38 is used to attach the proximal end 34 of the debris deflector 30 to the combine 22. In the preferred embodiment and as further illustrated in FIGS. 5-7, the flexible connecting means 38 comprises a spring 40 having an elastic section 42 and a hook 44 at each opposed end. The elastic section 42 of the spring 40 is preferably a series of concentric rings formed together into a coil. Alternatively, it is contemplated that any flexible, elastic, or spring type material or component may be used that is known to one skilled in the art. This includes but is not limited to bungee cord, elastic or shock cords and/or ropes.

The hook 44 at one of the opposed ends of the spring 40 is attached to the combine 22. In the preferred embodiment, the hook 44 is inserted up through an opening 46 in the combine 22. The opening 46 is formed by a sidewall 58 (FIG. 6) which coacts with the hook 44 to secure the spring 40 to the combine. Alternatively, the hook 44 may be secured to a bracket or any other type of means on the combine known to one skilled in the art for securing the hook 44 to the combine. In another alternative, any other type of fastener means such as an s-hook, bracket, adhesive, or any other means known to one skilled in the art may be used for fixedly attaching the spring 40 to the combine 22.

At the other of the opposed ends of the spring 40, the hook 44 is attached to a rigid member 48. In the preferred embodiment, the hook 44 wraps around the exterior of the rigid member 48 for fixedly attaching the spring 40 to the rigid member 48. Alternatively, any other type of fastener means such as an s-hook, bracket, adhesive, or any other means known to one skilled in the art may be used for fixedly attaching the spring 40 to the rigid member 48.

The debris deflector 30 is provided with a hollow sleeve 50 (FIG. 5) for releasably attaching the proximal end 34 of the debris deflector 30 to the rigid member 48. The hollow sleeve 50 extends between the opposed sides 32 of the debris deflector and provides openings 52 at each end. In the preferred embodiment, the rigid member 48 has a length which is greater than the width of the debris deflector 30. In this manner, the rigid member 48 can be inserted into opening 52, through the hollow sleeve 50, and out the other opening 52 thereby releasably attaching the rigid member 48 to the debris deflector 30 and providing a portion 54 of the rigid member 48, on each opposed side 32 of the debris deflector 30, to use for fixedly attaching the rigid member 48 to the spring 40.

A cable 56 may also be used as a backup means for securing the rigid member 48 to the combine 22 should the flexible attachment means 38 fail. In the preferred embodiment, starting at the rigid member 48, the cable 56 is inserted up through the center of the coil of the spring 40, continues up through the opening 46 in the combine 22, around the sidewall 58, and back down around the rigid member 48 for forming a closed loop. A crimp 60 or any other type of clasping means known to one skilled in the art is used to close the loop in the cable 56. In this manner, should the spring 40 break, the cable 56 is used to retain the rigid member 48 to the combine 22.

An end cap 62 is also provided at each of the ends of the rigid member 48. This end cap 62 serves several purposes: to cover the ends of the rigid member 48 and thereby safely protect a person from injury from an exposed end of the rigid member 48; to prevent, if necessary, the hook 44 from sliding off the rigid member 48 if the hook 44 is forced to traverse the rigid member 48 due to external forces while the combine 22 is in operation; and further to prevent, if necessary, the rigid member 48 from being released from the sleeve 50 of the debris deflector 30.

Referring back to FIG. 3, a rigid connecting means 64 at each opposed side of the debris deflector 30 is used to attach the distal end 36 to the header 24 of the combine 22. In the preferred embodiment and as further illustrated in FIG. 8, the rigid connecting means 64 comprises a magnet 66, a rigid member 68, and a means for fastening 70 the magnet 66 to the rigid member 68.

In the preferred embodiment, the magnet 66 is attached to the header 24 of the combine 22. Preferably, the magnet 66 is made from an alloy of neodymium, iron and boron, or other suitably strong magnetic material and the header 24 is made of any type of structure such as steel made from substances including but not limited to iron, nickel, cobalt, or other alloys that exhibit high magnetic permeability. In the preferred embodiment, the magnet 66 provides sufficient magnetic strength to hold the distal end 36 of the debris deflector 30 to the header 24 of the combine 22. Additionally, the magnets 66 provide a combined magnetic strength greater than that of the strength of the flexible connecting means 38 such that if the flexible connecting means 38 is stretched to its maximum, the force exerted on the debris deflector 30 and the rigid connecting means 64 will not be sufficient to overcome the magnetic strength to pull or separate the distal end 36 of the debris deflector 30 from the header 24.

The debris deflector 30 is again provided with a hollow sleeve 72 (FIG. 5) for releasably attaching the distal end 36 of the debris deflector 30 to the rigid member 68. The hollow sleeve 72 extends between the opposed sides 32 of the debris deflector and provides openings 74 at each end. In the preferred embodiment, the rigid member 68 has a length which is greater than the width of the debris deflector 30. In this manner, the rigid member 68 can be inserted into opening 74, through the hollow sleeve 72, and out the other opening 74 thereby releasably attaching the rigid member 68 to the debris deflector 30 and providing a portion 76 of the rigid member 68, on each opposed side 32 of the debris deflector 30, to use for fixedly attaching the rigid member 68 to the magnet 66.

The means for fastening 70 the magnet 66 to the rigid member 68 comprises a bolt 78, washers 80, and a cover 82. In this manner, the bolt 78 is inserted through a channel 84 in the rigid member 68, through the washers 80, and through the cover 82. A nut (not illustrated) is used to tighten these components together. A hole (not illustrated) is provided in the center of the magnet 66 to accommodate the nut for tightening and enable the magnet 66 to flushly engage the header 24 without any disruption from the nut. In this manner, the magnet 66 is also preferably circular in shape and having a sufficient thickness to accomplish the intended purposes herein. Alternatively, it is contemplated that the magnet 66 may be separated in many smaller magnets 66, the combination of which being used to provided the same results. In another alternative, the hollow sleeve 72 that extends between the opposed sides 32 may be separated from one continuous sleeve into two or more smaller hollow sleeves with each individual smaller hollow sleeve containing a separate individual rigid member and a means for fastening 70 each end of the individual rigid members to the header 24.

Figure 4:
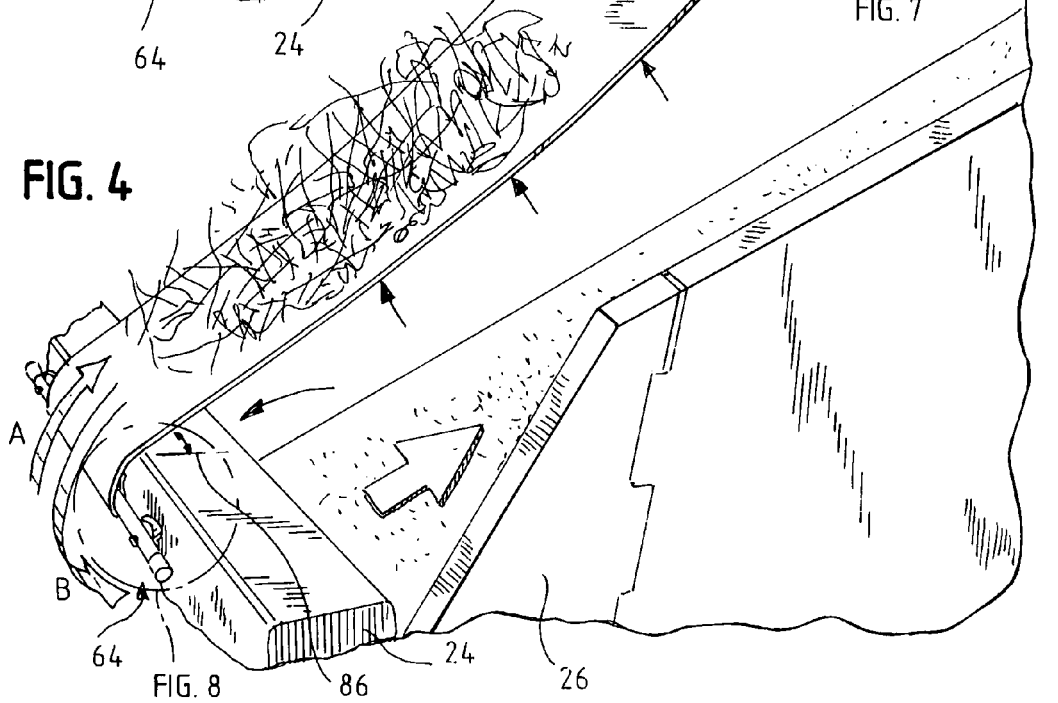
FIG. 4 is a perspective view of the debris deflector as attached to a combine when in use.

To begin, the debris deflector 30 is installed on the combine 22 between the header 24 and the front of the combine 22 and above the feeder house 26. The debris deflector 30 starts out in the relaxed or resting position as illustrated in FIG. 3. When the combine begins harvesting, the header 24 moves downwardly and away from the combine 22 causing the debris deflector 30 to be stretched into a smooth but sufficiently firm extension between the proximal end 30 and the distal end 32, as illustrated in FIG. 4. As this occurs, the flexible connecting means 38 rotates to allow the debris deflector 30 to accommodate the movement of the header 24. During harvesting, when some of the crop and other foreign material 28 escapes over the header 24 and the feeder house 26, along the path of arrow A, the material 28 is forced to engage the debris deflector 30. This engagement of the material 28 with the debris deflector 30 prohibits the material 28 from accumulating on top of the feeder house 26. As the debris deflector 30, while in use, is at an angle 86 with respect to the header 24, this orientation along with the gravitational force pulling on the material 28, causes the material 28 to move back, along the path of arrow B, and back in front of the header 24 for proper processing through the header 24 and into the feeder house 26. As a result, the debris deflector 30 prevents the accumulation of material 28 on the feeder house 26 and forces the material back into the system for processing through the combine 22, thereby, solving the problems as enumerated above and further increasing crop yields along with other inherent advantages.

Thus, there has been provided Applicant's unique debris deflector. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A debris deflector for preventing the accumulation of material between a cab and a header in a combine, comprising:
   a flexible cover having opposed sides, a proximal end and a distal end, the proximal end and the opposed sides defining opposed proximal corners and the distal end and the opposed sides defining opposed distal corners;
   a spring means for attaching the proximal end of the cover to the combine, the spring means disposed between each of the proximal corners of the cover and the combine, the spring means having opposed ends with one end connected to the proximal corner of the cover and the other end connected to the combine;
   a first rigid reinforcing member;
   a first sleeve located adjacent the distal end of the cover, the first sleeve having a first open end at one of the opposed sides and a second open end at the other of the opposed sides and a first passageway extending between them, the first rigid reinforcing member is slidably received into the first open end, through the first passageway, and exiting out the second open end, the first rigid reinforcing member providing a first portion and a second portion extending outwardly from each open end of the first sleeve;
   a plurality of magnets;
   means for fastening one of the plurality of magnets to the first and second portions of the first rigid reinforcing member; and
   upon magnetically securing each of the plurality of magnets to the header, the distal end of the cover is attached to the header.

2. The device of claim 1 and further comprising the spring means for attaching the proximal end of the cover to the combine having a flexible expandable cord disposed between the proximal corners and the combine.

3. The device of claim 1 and further comprising a second rigid reinforcing member along the proximal end for providing structural strength to the cover between the proximal corners.

4. The device of claim 3 and further comprising means for attaching the second rigid reinforcing member to the proximal end of the cover.

5. The device of claim 4 and further comprising connecting means for attaching the second rigid reinforcing member to the spring means.

6. The device of claim 4 and further comprising the means for attaching the second rigid reinforcing member to the proximal end of the cover having a second sleeve located adjacent the proximal end of the cover, the second sleeve having a third open end at one of the opposed sides and a fourth open end at the other of the opposed sides and a second passageway extending between them, the second rigid reinforcing member is slidably received into the third open end, through the second passageway, and exiting out the fourth open end, the second rigid reinforcing member providing a third portion and a fourth portion extending outwardly from each open end of the second sleeve.

7. The device of claim 6 and further comprising connecting means for attaching the third and fourth portions of the second rigid reinforcing member to the spring means.

8. The device of claim 1 and further comprising a cable having a first end and a second end, the first end of the cable mounted to and extending from the combine with the second end connected to the cover.

9. The device of claim 8 and further comprising a second cable mounted to and extending from the combine to the cover.

10. A debris deflector for securing between a combine and a farm implement, comprising:
    a cover having opposed sides, a proximal end and a distal end;
    a plurality of springs having opposed ends;
    a first rigid reinforcing member;
    a first sleeve located adjacent the proximal end of the cover, the first sleeve having a first open end at one of the opposed sides and a second open end at the other of the opposed sides and a first passageway extending between them, the first rigid reinforcing member is slidably received into the first open end, through the first passageway, and exiting out the second open end, the first rigid reinforcing member providing a first portion and a second portion extending outwardly from each open end of the first sleeve;
    first connecting means for attaching each of the first and second portions of the first rigid reinforcing member to one of the opposed ends of the plurality of springs;
    second connecting means for attaching the other of the opposed ends of the plurality of springs to the combine;
    upon securing each of the plurality of springs to the first rigid reinforcing member and the combine, the proximal end of the cover is attached to the combine;
    a first magnet;
    means for attaching the first magnet to the distal end of the cover; and
    upon magnetically securing the first magnet to the farm implement, the distal end of the cover is attached to the farm implement.

11. The device of claim 10 and further comprising a cable having a first end and a second end and means for attaching the first end of the cable to the proximal end of the cover and the second end of the cable to the combine.

12. The device of claim 10 and further comprising a second magnet and means for attaching the second magnet to the distal end of the cover.

13. A debris deflector for preventing the accumulation of material between a cab and a header in a combine, comprising:
    a flexible cover having opposed sides, a proximal end and a distal end, the proximal end and the opposed sides defining opposed proximal corners and the distal end and the opposed sides defining opposed distal corners;
    a plurality of springs having opposed ends;
    a first rigid reinforcing member;
    a first sleeve located adjacent the proximal end of the cover, the first sleeve having a first open end at one of the opposed sides and a second open end at the other of the opposed sides and a first passageway extending between them, the first rigid reinforcing member is slidably received into the first open end, through the first passageway, and exiting out the second open end, the first rigid reinforcing member providing a first portion and a second portion extending outwardly from each open end of the first sleeve;
    first connecting means for attaching each of the first and second portions of the first rigid reinforcing member to one of the opposed ends of the plurality of springs;

second connecting means for attaching the other of the opposed ends of the plurality of springs to the combine;

upon securing each of the plurality of springs to the first rigid reinforcing member and the combine, the proximal end of the cover is attached to the combine;

a second rigid reinforcing member;

a second sleeve located adjacent the distal end of the cover, the second sleeve having a third open end at one of the opposed sides and a fourth open end at the other of the opposed sides and a second passageway extending between them, the second rigid reinforcing member is slidably received into the third open end, through the second passageway, and exiting out the fourth open end, the second rigid reinforcing member providing a third portion and a fourth portion extending outwardly from each open end of the second sleeve;

a plurality of magnets;

means for fastening one of the plurality of magnets to the third and fourth portions of the second rigid reinforcing member; and upon magnetically securing each of the plurality of magnets to the header, the distal end of the cover is attached to the header.

* * * * *